Oct. 13, 1959  M. CRAIG  2,908,127
TRIMMER AND EDGER ATTACHMENT FOR LAWNMOWERS
Filed Dec. 10, 1957  2 Sheets-Sheet 1

INVENTOR
Milton Craig

BY  *Cecil L. Wood*

ATTORNEY

Oct. 13, 1959  M. CRAIG  2,908,127
TRIMMER AND EDGER ATTACHMENT FOR LAWNMOWERS
Filed Dec. 10, 1957  2 Sheets-Sheet 2
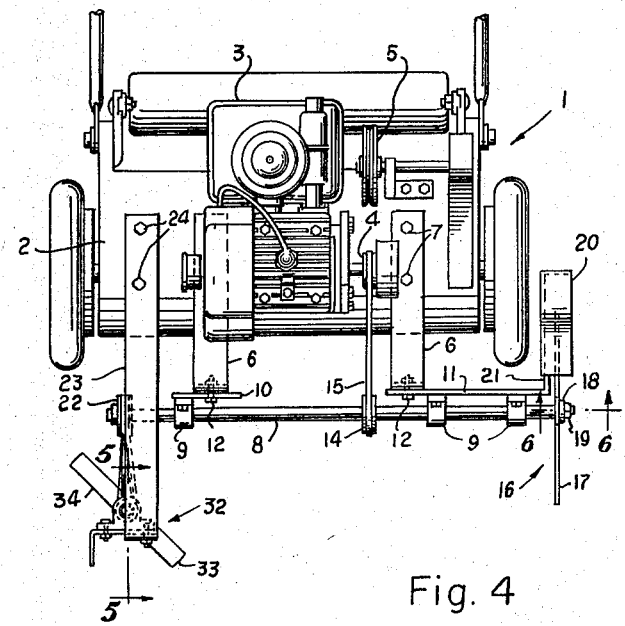
Fig. 4
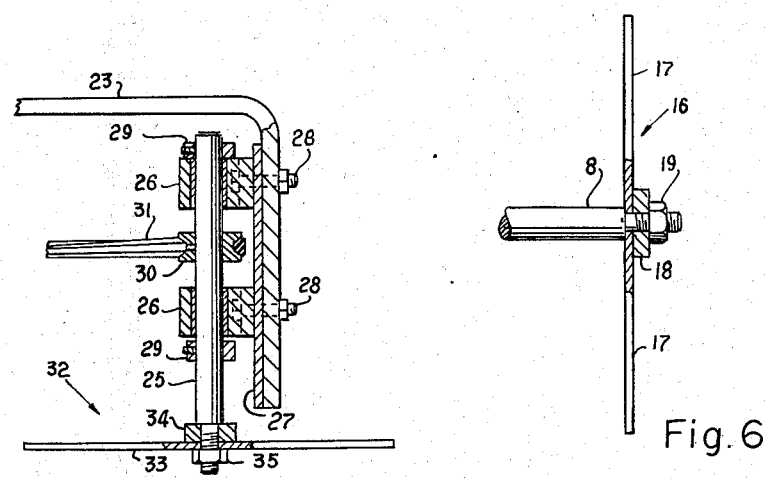
Fig. 5
Fig. 6
INVENTOR
Milton Craig
BY Cecil L. Wood
ATTORNEY

United States Patent Office 2,908,127
Patented Oct. 13, 1959

2,908,127

TRIMMER AND EDGER ATTACHMENT FOR LAWNMOWERS

Milton Craig, Midland, Tex.

Application December 10, 1957, Serial No. 701,821

2 Claims. (Cl. 56—26)

This invention relates to a trimmer and edger attachment for lawn mowers, and it concerns more particularly a combined trimmer and edger attachment for reel type gasoline driven power lawn mowers.

An object of the invention is to provide, in combination with a reel type gasoline driven power lawn mower, a combined trimmer and edger attachment which is connected to the mower by a comparatively small number of bolts whereby it may be readily connected to or disconnected therefrom.

Another object of the invention is to provide a trimmer and edger attachment having means for operatively supporting the cutting blades, and drive means therefor, whereby vibration of the blades is eliminated and an even, steady cut is obtained.

Another object of the invention is to provide a trimmer and edger attachment which is operatively connected to the same power source which normally drives the mower, the mower being disengaged therefrom, whereby the trimmer, or alternatively, the edger, may be operated at any engine speed independently of the forward speed of the mower wheels and carriage.

A further object of the invention is to provide a trimmer and edger attachment in which the drive shafts and the cutting blades are positioned beyond the mower wheels and carriage, which permits trimming or edging in an even cut around walls, trees, and other objects.

The invention will be readily understood by referring to the following description and the accompanying drawing, in which:

Figure 4 is a top plan view;

Figure 5 is a fragmentary sectional elevational view, on an enlarged scale, taken on the lines 5—5 of Figure 4; and Figure 6 is a fragmentary sectional elevational view, on an enlarged scale, taken on the lines 6—6 of Figure 4.

Figure 1:
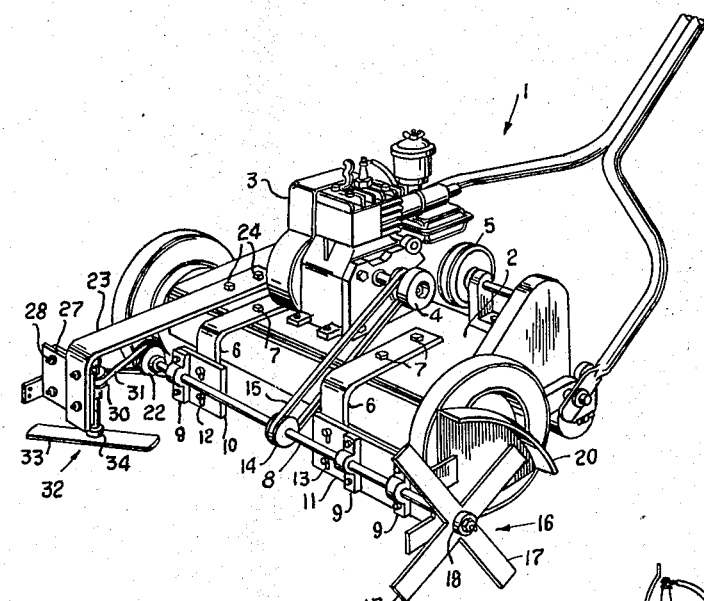
Figure 1 is a perspective view of a gasoline driven reel type power lawn mower having a trimmer and edger attachment embodying the invention operatively connected thereto.
Figure 2:
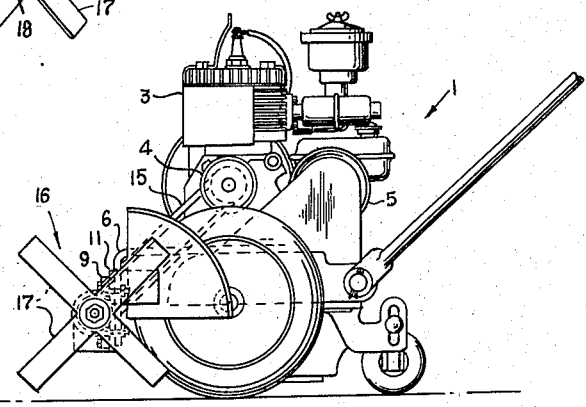
Figure 2 is an elevational view showing one side of the mower.
Figure 3:
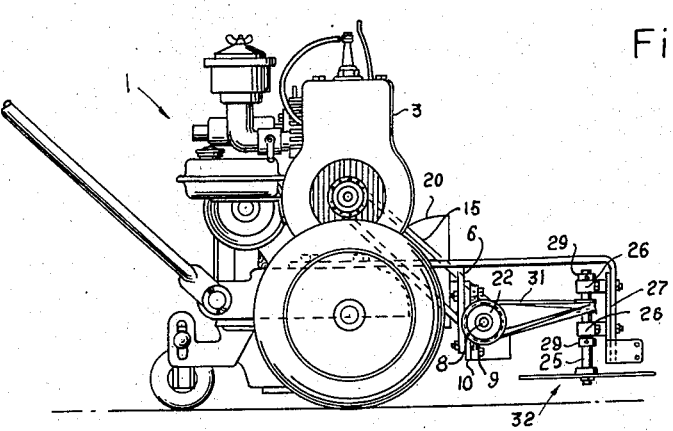
Figure 3 is an elevational view showing the opposite side of the mower.

Referring to the drawing, a gasoline driven reel type power lawn mower is designated generally by the numeral 1. The mower has a housing 2 which provides a platform on which a gasoline driven engine 3 is mounted. A pulley wheel 4, which is connected to the drive shaft of the engine 3, is normally connected to a pulley wheel 5, which drives the blades and wheels of the mower 1, by a belt (not shown) which has been removed therefrom whereby the mower is disengaged from the engine 3.

A pair of angular brackets 6, each of which consists of a rigid metal strip bent substantially at right angles intermediate its ends, have horizontally disposed end portions which are removably connected to the top of the housing 2, in spaced, parallel relation to each other, by bolts 7. The brackets 6 extend forwardly beyond the housing 2, and have downwardly turned forward end portions which are spaced apart from the housing 2.

A horizontally disposed shaft 8, which is arranged transversely relative to the mower 1, is journaled in bearings 9, one of which is mounted on a vertically disposed plate 10 and two of which are mounted on a vertically disposed plate 11. The plates 10 and 11 are adjustably connected, respectively, to the forward end portions of the brackets 6 by bolts 12, which are received in elongated vertical slots 13 formed in the plates 10 and 11 and corresponding openings formed in the brackets 6.

A pulley wheel 14, which is rigidly connected to the shaft 8 intermediate its ends, is connected by a belt 15 to the pulley wheel 4 whereby the shaft 8 is driven by the engine 3.

A cutter 16, which has four radially extending, circumferentially spaced blades 17 and a central hub 18, is provided for use as an edger. The cutter 16 is connected to one end of the shaft 8, which extends outwardly beyond the adjacent side of the mower 1. The adjacent end of the shaft 8 is reduced to form an outwardly facing annular shoulder for engagement with the cutter 16, and is threaded for engagement by a nut 19.

A guard for the cutter 16, which is quadrant shaped and has an arcuate flange formed on one side, is designated by the numeral 20. The guard 20 is attached to a rearwardly bent tab 21 which is formed on one end of the vertically disposed plate 11.

A pulley wheel 22, for use in driving the trimmer as hereinafter described, is rigidly connected to the end of the shaft 8 opposite the cutter 16, on the opposite side of the mower 1.

A bracket 23, which is similar to the brackets 6, is connected to the top of the housing 2 opposite the pulley wheel 22 by bolts 24. The bracket 23 extends forwardly beyond the shaft 8, and has a downwardly turned forward end portion which is spaced apart from the shaft 8. A vertically disposed stub shaft 25 is journaled intermediate its ends in bearings 26, which are mounted on a vertically disposed plate 27. The plate 27 is connected to the forward end portion of the bracket 23 by bolts 28. Thrust bearings 29 are adjustably connected to the shaft 25 above and below the bearings 26 whereby the shaft 25 is adjustable vertically.

A pulley wheel 30, which is rigidly connected to the shaft 25 intermediate its ends, is connected by a belt 31 to the pulley wheel 22 whereby the shaft 25 is driven by the shaft 8.

A cutter 32, which has two diametrically opposed blades 33 and a central hub 34, is provided for use as a trimmer. The cutter 32 is connected to the lower end of the shaft 25. The adjacent end of the shaft 25 is reduced to form a downwardly facing annular shoulder for engagement with the cutter 32, and is threaded for engagement by a nut 35.

In the operation of the device, the cutter 16, which comprises the edger, and the cutter 32, which comprises the trimmer, are used one at a time. When the edger is in use the trimmer is detached by removing the bolts 24, which secure the bracket 23 to the housing 2, and disengaging the belt 31 from the pulley wheel 22. When the trimmer is in use the edger is detached by removing the nut 19, which secures the cutter 16 to the shaft 8.

The apparatus of the invention may be detached from the mower 1 as a unit by removing the bolts 7 and 24, which secure the brackets 6 and 23 to the housing 2, and disengaging the belt 15 from the pulley wheel 4.

The invention may be modified in various ways without departing from the spirit and scope thereof.

What is claimed is:

1. In combination with a gasoline driven reel type power lawn mower having a housing providing a platform on which the engine is mounted, and having a first drive shaft connected directly to the engine and extending substantially horizontally, transversely of the mower, a first pulley wheel connected to the first drive shaft, a second drive shaft arranged parallel to the first drive shaft, rearwardly thereof, drivingly connected to the blades and wheels of the mower, and a second pulley wheel connected to the second drive shaft and normally connected by a belt to the first pulley wheel, whereby the mower is driven, a pair of angular brackets each consisting of a rigid metal strip bent substantially at right angles intermediate its ends, and having horizontally disposed end portions removably connected to the top of the housing, in spaced apart, parallel relation to each other, the brackets extending forwardly beyond the housing and having downwardly turned forward end portions spaced apart from the housing, a tool shaft arranged parallel to the first and second drive shafts and rotatably supported in bearings having means adjustably connecting them to the forward end portions of the brackets, for adjustment vertically relative thereto, the length of the tool shaft being substantially coextensive with the width of the mower, one end of the tool shaft extending outwardly beyond the adjacent side of the mower, a cutting tool removably connected to said end of the tool shaft, a third pulley wheel connected to the tool shaft intermediate its ends, and a belt connecting the third pulley wheel to the first pulley wheel whereby the tool shaft is driven by the first drive shaft.

2. The structure of claim 1, a fourth pulley wheel connected to the end of the tool shaft opposite the cutting tool, adjacent the opposite side of the mower, an angular bracket consisting of a rigid metal strip bent substantially at right angles intermediate its ends, and having a horizontally disposed end portion removably connected to the top of the housing, opposite the fourth pulley wheel, the last mentioned bracket extending forwardly beyond the tool shaft and having a downwardly turned forward end portion spaced apart from the tool shaft, a vertically disposed tool shaft rotatably supported in bearings having means connecting them to the forward end portion of the last mentioned bracket, and adjustable vertically relative thereto, a cutting tool connected to the lower end of the vertically disposed tool shaft, a fifth pulley wheel connected to the vertically disposed tool shaft intermediate its ends, and a belt connecting the fifth pulley wheel to the fourth pulley wheel whereby the vertically disposed tool shaft is driven by the first mentioned tool shaft.

References Cited in the file of this patent

UNITED STATES PATENTS

| | | |
|---|---|---|
| 2,521,033 | Bell | Sept. 5, 1950 |
| 2,618,919 | Hutchens | Nov. 25, 1952 |
| 2,643,503 | Noyes | June 30, 1953 |
| 2,680,945 | Reed | June 15, 1954 |
| 2,775,856 | Hoch | Jan. 1, 1957 |